United States Patent
Tian et al.

(10) Patent No.: US 11,387,971 B2
(45) Date of Patent: Jul. 12, 2022

(54) METHOD FOR DETERMINING SYSTEM INFORMATION OF CELL AND TERMINAL

(71) Applicant: GUANGDONG OPPO MOBILE TELECOMMUNICATIONS CORP., LTD., Guangdong (CN)

(72) Inventors: Wenqiang Tian, Guangdong (CN); Zuomin Wu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/410,260

(22) Filed: Aug. 24, 2021

(65) Prior Publication Data
US 2021/0385054 A1 Dec. 9, 2021

Related U.S. Application Data

(63) Continuation of application No. PCT/CN2019/109312, filed on Sep. 30, 2019.

(51) Int. Cl.
| H04L 12/28 | (2006.01) |
| H04L 5/00 | (2006.01) |
| H04W 16/14 | (2009.01) |
| H04W 72/04 | (2009.01) |
| H04J 1/16 | (2006.01) |

(52) U.S. Cl.
CPC .......... *H04L 5/0092* (2013.01); *H04W 16/14* (2013.01); *H04W 72/0453* (2013.01)

(58) Field of Classification Search
CPC . H04J 11/0069; H04J 11/0073; H04L 5/0023; H04L 27/2657; H04L 5/0053; H04W 16/14; H04W 56/00; H04W 56/001; H04W 48/12; H04W 72/0453

USPC ................. 370/252, 329, 430, 503
See application file for complete search history.

(56) References Cited

U.S. PATENT DOCUMENTS

| 2017/0353257 A1 | 12/2017 | Islam et al. | |
| 2019/0159226 A1* | 5/2019 | Ly | H04L 5/0053 |
| 2020/0059927 A1* | 2/2020 | Sun | H04L 5/0053 |
| 2020/0162931 A1* | 5/2020 | Chakraborty | H04W 16/14 |

(Continued)

FOREIGN PATENT DOCUMENTS

| CN | 108401487 A | 8/2018 |
| CN | 108702700 A | 10/2018 |
| CN | 110035493 A | 7/2019 |

(Continued)

OTHER PUBLICATIONS

3GPP TSG RAN WG1 Meeting #92—R1-1801708—Athens, Greece, Feb. 26-Mar. 2, 2018—CATT, Remaining Issues on NR PBCH (6 pages).

(Continued)

*Primary Examiner* — John Pezzlo
(74) *Attorney, Agent, or Firm* — Perkins Coie LLP

(57) ABSTRACT

Implementations of the present disclosure relate to a wireless communication method and a terminal device. The method includes: detecting, by a terminal device, a first type of Synchronous Signal Block (SSB) at a frequency on an asynchronous raster; determining, by the terminal device, a frequency domain position of a Control Resource Set (CORESET) of Remaining Minimum System Information (RMSI) associated with the first type of SSB based on the first type of SSB.

16 Claims, 7 Drawing Sheets

200

A terminal device detects a first type of Synchronous Signal Block (SSB) at a frequency on an asynchronous raster — 210

The terminal device determines a frequency domain position of a Control Resource Set (CORESET) of Remaining Minimum System Information (RMSI) associated with the first type of SSB based on the first type of SSB — 220

(56) References Cited

U.S. PATENT DOCUMENTS

| | | | |
|---|---|---|---|
| 2021/0203453 A1* | 7/2021 | Kim | H04W 72/1263 |
| 2021/0235420 A1* | 7/2021 | Kim | H04L 27/2613 |

FOREIGN PATENT DOCUMENTS

| | | | |
|---|---|---|---|
| WO | 2018016907 A1 | 1/2018 | |
| WO | 2018213026 A1 | 11/2018 | |
| WO | 2019029809 A1 | 2/2019 | |
| WO | 2019148438 A1 | 8/2019 | |

OTHER PUBLICATIONS

3GPP TSG RAN WG1 Meeting AH 1801—R1-1800228—Vancouver, Canada, Jan. 22-26, 2018—CATT, Remaining details on NR PBCH (8 pages).

International Search Report dated Jun. 24, 2020 of PCT/CN2019/109312 (4 pages).

3GPP "Physical Layer Procedures for Control (Release 15); Technical Specification 3GPP TS 38.213 V15.7.9 (Sep. 2019)" 2019. 108 pages.

Extended European Search Report for European Application No. 19948006.2 dated Nov. 25, 2021. 13 pages.

Nokia et al. "Remaining details related to SS blocks" R1-1720879; 3GPP TSG-RAN WG1 Meeting #91; Reno, Nevada, USA; Nov. 27-Dec. 1, 2017. 7 pages.

Qualcomm Incorporated "Feature lead summary on initial access signals and channels for NR-U" R1-1909814; 3GPP TSG RAN WG1 Meeting #98; Prague, CZ; Aug. 26-30, 2019. 49 pages.

CATT "Summary of Offline Discussion on Remaining Minimum System Information" R1-1720169; 3GPP TSG RAN WG1 Meeting 91; Reno, USA; Nov. 27-Dec. 1, 2017. 39 pages.

Examination Report for Indian Application No. 202127035629 dated May 6, 2022. 6 pages with English translation.

Examination Report No. 1 for Australian Application No. 2019468915 dated Apr. 13, 2022. 4 pages.

First Office Action for Chinese Application No. 2021104292367 dated Apr. 28, 2022. 17 pages with English translation.

Spreadtrum Communications "Association between SS blocks and the corresponding RMSI(s) in wideband operation" R1-1719827; 3GPP TSG RAN WG1 Meeting 91; Reno, USA Nov. 27-Dec. 1, 2017. 6 pages.

* cited by examiner

200

A terminal device detects a first type of Synchronous Signal Block (SSB) at a frequency on an asynchronous raster — 210

The terminal device determines a frequency domain position of a Control Resource Set (CORESET) of Remaining Minimum System Information (RMSI) associated with the first type of SSB based on the first type of SSB — 220

METHOD FOR DETERMINING SYSTEM INFORMATION OF CELL AND TERMINAL

CROSS-REFERENCE TO RELATED APPLICATION

The present application is a continuation application of International PCT Application No. PCT/CN2019/109312, filed on Sep. 30, 2019, the entire content of which is hereby incorporated by reference.

TECHNICAL FIELD

The present disclosure relates to the field of communication, and more particularly, to a wireless communication method and a terminal device.

BACKGROUND

Data transmission on an unlicensed spectrum is supported in a New Radio (NR) system. When a communication device communicates on the unlicensed spectrum, a principle of Listen Before Talk (LBT) needs to be based, that is, before the communication device sends a signal on a channel of the unlicensed spectrum, channel listening (or channel sensing) needs to be performed first, and only when a result of channel listening is that the channel is idle, can the communication device send the signal. If the result of channel listening by the communication device on the unlicensed spectrum is that the channel is busy, the signal cannot be sent.

There is a need for a terminal device to find a cell at an asynchronous raster frequency and determine Remaining Minimum System Information (RMSI) of the cell in the unlicensed spectrum, so how to determine a Control-Resource Set (CORESET) of the RMSI of the cell is an urgent problem to be solved.

SUMMARY

Implementations of the present disclosure provide a wireless communication method and a terminal device, which may effectively determine a frequency domain position of a CORESET of RMSI associated with SSB on an asynchronous raster.

In a first aspect, a wireless communication method is provided, including: detecting, by a terminal device, a first type of Synchronous Signal Block (SSB) at a frequency on an asynchronous raster; and determining, by the terminal device, a frequency domain position of a Control Resource Set (CORESET) of Remaining Minimum System Information (RMSI) associated with the first type of SSB based on the first type of SSB.

In a second aspect, a terminal device is provided, including: a processing unit, configured to detect a first type of Synchronous Signal Block (SSB) at a frequency on an asynchronous raster; and the processing unit is further configured to determine, based on the first type of SSB, a frequency domain position of a Control Resource Set (CORESET) of Remaining Minimum System Information (RMSI) associated with the first type of SSB.

In a third aspect, a terminal device is provided, including a processor and a memory. The memory is configured to store a computer program, and the processor is configured to call and run the computer program stored in the memory to execute the method in the above first aspect or various implementation modes thereof.

In a fourth aspect, an apparatus is provided, configured to implement the method in the above first aspect or various implementation modes thereof.

Specifically, the apparatus includes a processor configured to call and run a computer program from a memory to enable a device with the apparatus installed to perform the method in the above first aspect or various implementation modes thereof.

Optionally, the apparatus may be a chip.

In a fifth aspect, a computer readable storage medium is provided, configured to store a computer program, and the computer program enables a computer to perform the method in the above first aspect or various implementation modes thereof.

In a sixth aspect, a computer program product is provided, including computer program instructions, and the computer program instructions enable a computer to perform the method in the above first aspect or various implementation modes thereof.

In a seventh aspect, a computer program is provided, which, when running on a computer, enables the computer to perform the method in the above first aspect or various implementation modes thereof.

With the technical solution, after a terminal device detects a first type of SSB at a frequency on an asynchronous raster, it may determine a frequency domain position of a CORESET of RMSI associated with the first type of SSB according to the detected SSB, so that the frequency domain position of a CORESET of RMSI associated with SSB on an asynchronous raster may be effectively determined.

DETAILED DESCRIPTION

The technical solutions in implementations of the present disclosure will be described below with reference to the drawings in implementations of the present disclosure. It is apparent that the implementations described are just some implementations of the present disclosure, but not all implementations of the present disclosure. According to the implementations of the present disclosure, all other implementations achieved by a person of ordinary skill in the art without paying an inventive effort are within the protection scope of the present disclosure.

The technical solutions of the implementations of the present disclosure may be applied to various communication systems, such as a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, LTE Time Division Duplex (TDD), an Advanced long term evolution (LTE-A) system, a New Radio (NR) system, an evolution system of NR system, an LTE-based access to unlicensed spectrum (LTE-U) system, an NR-based access to unlicensed spectrum (NR-U) system, a Universal Mobile Telecommunication System (UMTS), a Worldwide Interoperability for Microwave Access (WiMAX) communication system, Wireless Local Area Networks (WLAN), Wireless Fidelity (WiFi), a next generation communication system or other communication systems.

Figure 1:
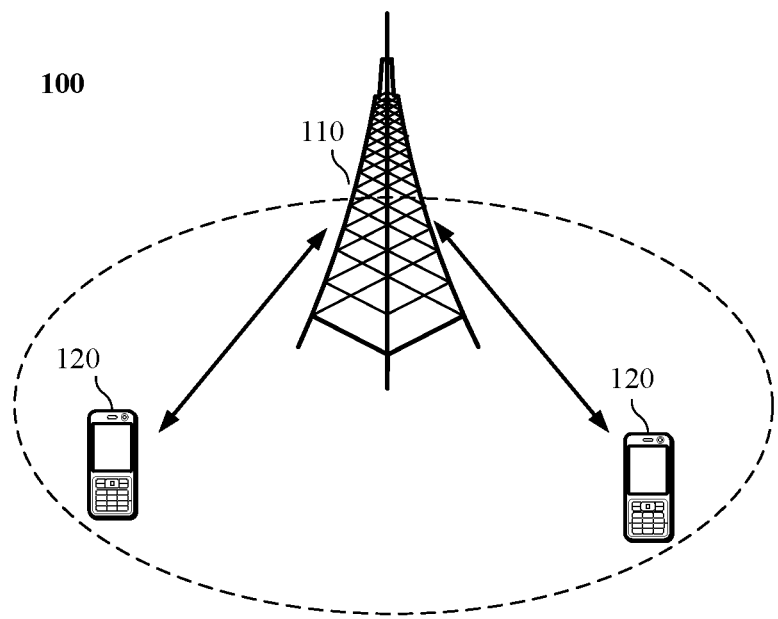
FIG. 1 is a schematic diagram of an architecture of a communication system according to an implementation of the present disclosure.

Illustratively, a communication system 100 applied in an implementation of the present disclosure is shown in FIG. 1. The communication system 100 may include a network device 110, and the network device 110 may be a device that communicates with a terminal device 120 (or referred to as a communication terminal, or a terminal). The network device 110 may provide communication coverage for a specific geographical area, and may communicate with terminal devices located within the coverage area. Optionally, the network device 110 may be a Base Transceiver Station (BTS) in a GSM system or CDMA system, a NodeB (NB) in a WCDMA system, an Evolutional Node B (eNB or eNodeB) in an LTE system, or a radio controller in a Cloud Radio Access Network (CRAN), or the network device may be a mobile switch center, a relay station, an access point, a vehicle-mounted device, a wearable device, a hub, a switch, a bridge, a router, or a network side device in a 5G network, or a network device in a future evolved Public Land Mobile Network (PLMN), etc.

The communication system 100 further includes at least one terminal device 120 located within the coverage area of the network device 110. As used herein, the term "terminal device" includes, but not limited to, a device configured to receive/send a communication signal via a wired circuit, for example, via a Public Switched Telephone Network (PSTN), a Digital Subscriber Line (DSL), a digital cable, a direct cable; and/or another data connection/network; and/or via a wireless interface, for instance, for a cellular network, a Wireless Local Area Network (WLAN), a digital television network such as a Digital Video Broadcasting-Handheld (DVB-H) network, a satellite network, and an AM-FM broadcast transmitter; and/or another terminal, and/or an Internet of Things (IoT) device. A terminal device configured to communicate via a wireless interface may be referred to as a "wireless communication terminal", a "wireless terminal" or a "mobile terminal". Examples of the mobile terminal include, but are not limited to, a satellite or cellular telephone, a Personal Communication System (PCS) terminal that can be combined with a cellular wireless telephone and data processing, faxing, and data communication abilities, a Personal Digital Assistant (PDA) that may include a radio telephone, a pager, an internet/intranet access, a Web browser, a memo pad, a calendar, and/or a Global Positioning System (GPS) receiver, and a conventional laptop and/or palmtop receiver, or another electronic apparatus including a radio telephone transceiver. The terminal device may be referred to as an access terminal, a User Equipment (UE), a subscriber unit, a subscriber station, a mobile station, a rover platform, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, or another processing device connected to a wireless modem, a vehicle-mounted device, a wearable device, a terminal device in a 5G network, or a terminal device in a future evolved Public Land Mobile Network (PLMN), or the like.

Optionally, Device to Device (D2D) communication may be performed between the terminal devices 120.

Optionally, the 5G system or 5G network may be referred to as a New Radio (NR) system or an NR network.

FIG. 1 exemplifies one network device and two terminal devices. Optionally, the communication system 100 may include multiple network devices, and another quantity of terminal devices may be included within a coverage range of each network device, which is not limited in an implementation of the present disclosure.

Optionally, the communication system 100 may include other network entities such as a network controller, and a mobile management entity, which is not limited in an implementation of the present disclosure.

It should be understood that, a device with a communication function in a network/system in an implementation of the present disclosure may be referred to as a communication device. Taking the communication system 100 shown in FIG. 1 as an example, the communication device may include a network device 110 and a terminal device 120 which have communication functions, and the network device 110 and the terminal device 120 may be the specific devices described above, which will not be repeated here again. The communication device may also include another device in the communication system 100, such as a network controller, a mobile management entity, and other network entity, which is not limited in the implementations of the present disclosure.

It should be also understood that the communication system 100 shown in FIG. 1 may further be an NTN system, that is, the network device 110 in FIG. 1 may be a satellite.

It should be understood that the terms "system" and "network" are often used interchangeably in this document.

Figure 2:
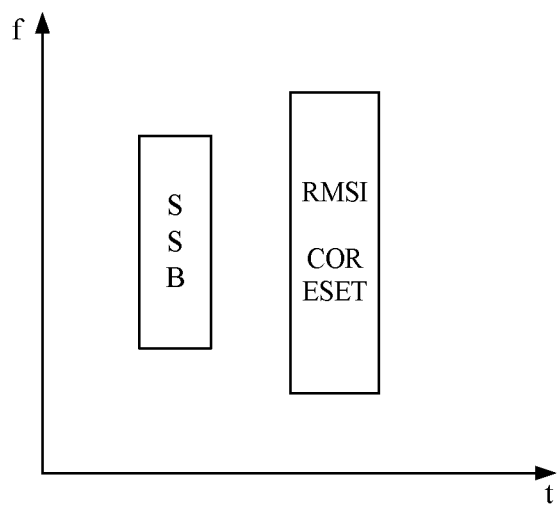
FIG. 2 is a schematic diagram of a relationship between SSB and CORESET of RMSI.
Figure 3:
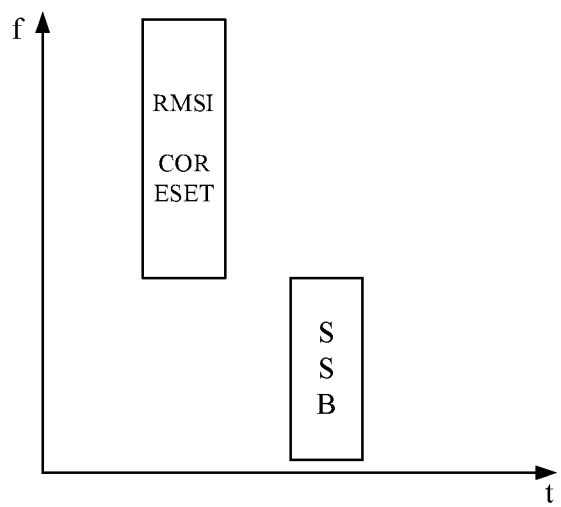
FIG. 3 is a schematic diagram of a relationship between SSB and CORESET of RMSI.
Figure 4:
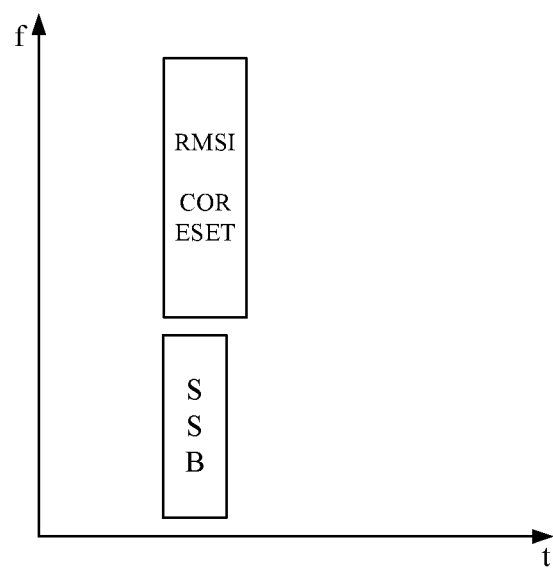
FIG. 4 is a schematic diagram of a relationship between SSB and CORESET of RMSI.

FIGS. 2 to 4 show relationships between Synchronization Signal block (SSB)/Physical Broadcast Channel (PBCH) and CORESET of RMSI. In FIG. 2, SSB and CORESET of RMSI are in a Time Division Multiplexing (TDM) relationship (called pattern 1). In FIG. 3, SSB and CORESET of RMSI are in a relatively fixed relationship and are not overlapped in a time domain and a frequency domain (called pattern 2). In FIG. 4, SSB and CORESET of RMSI are in a relatively fixed relationship and in a relationship of Frequency Division Multiplexing (FDM) (called pattern 3).

Herein, the SSB may include a Primary Synchronization Signal (PSS), a Secondary Synchronization Signal (SSS), and a Physical Broadcasting Channel (PBCH).

According to the above three relationships, in 5G, a terminal device may determine a position of the CORESET of the RMSI through a RMSI-PDCCH-Config field in a Master Information Block (MIB) message. The RMSI-PDCCH-Config field is composed of 8 bits, wherein 4 bits are used for determining information of the CORESET, for example, the 4 bits may constitute a ControlResourceSetZero field; the other 4 bits may be used for confirming information of a search space, for example, the 4 bits may constitute a SearchSpaceZero field.

With regard to information used for determining the CORESET, aiming at the above three patterns, the terminal device may acquire a current pattern situation, a CORESET frequency domain resource size (Number of RBs), a CORESET time domain resource size (Number of Symbols), and a relative frequency domain Offset between the SSB and the CORESET of the RMSI.

Here, the Offset may be understood as an offset between a minimum Resource Block (RB) number of CORESET and an RB number of a minimum Common Resource Block (CRB) overlapped with a first RB of the SSB, that is, the offset here is a frequency domain offset of the CORESET of the RMSI relative to the SSB.

5G defines a method of determining CORESET of cell RMSI by SSB at a Synchronization raster frequency. Specifically, first, in a process of cell search, a terminal device may determine a frequency domain position of SSB through a synchronous raster frequency predefined by a protocol. Then, the terminal device may determine a frequency domain position of the CORESET of the RMSI based on an indication of a limited and specific offset, that is, an offset between the CORESET of the RMSI and the SSB indicated by the RMSI-PDCCH-Config field with reference to the determined frequency domain position of the SSB.

The SSB in the above content is an SSB used for defining a cell, that is, an SSB sent at a synchronous raster frequency, and the SSB is generally associated with the RMSI, that is, after detecting an SSB, the terminal device may correspondingly detect the RMSI corresponding to the SSB, that is, it may acquire cell information. It should be understood that a name of the SSB is not limited in an implementation of the present disclosure, that is, the SSB may be called a Cell define SSB (CD-SSB), or a second type of SSB, or other name.

The above method of determining a resource position of CORESET of RMSI based on an SSB at a synchronous raster frequency is effective in a 5G system. However, in an unlicensed spectrum, since there is a need to find a cell at an asynchronous raster frequency and determine System Information Block (SIB) information of the cell, the above method will no longer be applicable.

In order to deepen understanding of the implementations of the present disclosure, an unlicensed spectrum is briefly introduced below.

An unlicensed spectrum is a spectrum divided for countries and regions that may be used for radio device communication. The spectrum may be considered as a shared spectrum, that is, communication devices in different communication systems may use the spectrum and may not apply for exclusive spectrum authorization from the government, as long as they meet a regulatory requirement on the spectrum set by countries or regions. In order to enable various communication systems using the unlicensed spectrum for wireless communication to coexist friendly on the spectrum, a principle of Listen Before Talk (LBT) needs to be based, that is, before a communication device sends a signal on a channel of the unlicensed spectrum, channel listening (or channel sensing) needs to be performed first, and only when a result of channel listening is that the channel is idle, can the communication device send the signal. If the result of channel listening by the communication device on the unlicensed spectrum is that the channel is busy, the signal cannot be sent. And in order to ensure fairness, in one transmission, a duration of signal transmission by the communication device using the channel on the unlicensed spectrum may not exceed a Maximum Channel Occupation Time (MCOT).

Since the unlicensed spectrum is a shared spectrum, there may be a case that different operators or companies share a same frequency band or frequency, and at this time, various network users may use a limited channel resource through competition. At this time, a problem which may occur is that, if both operators A and B deploy cells ID25(A) and ID25(B) with a same cell ID on a same frequency, and both of the cells are used as auxiliary cells, their synchronization signals or SSBs may be deployed and sent at asynchronous raster frequencies.

In addition, in this case, in order to distinguish, by the terminal device, different operators' information to avoid a problem such as cell confusion or potential wrong scheduling caused by different operators deploying cells with a same cell ID at a same frequency, the terminal device may further need to determine, through SIB1 or another broadcast message, network information such as a Public Land Mobile Network (PLMN) or a Cell Global Identifier (CGI), or global cell ID information.

Therefore, how a terminal device determines RMSI (SIB1) of a cell where SSB of an asynchronous raster frequency is located is an urgent problem to be solved. The existing technology cannot solve the problem. For example, referring to FIG. 5, after the terminal device finds SSB1 at a synchronous raster frequency, it may determine a frequency domain position of CORESET of RMSI according to indication information in MIB. Since in the existing technology, only limited frequency domain positions of SSBs relative to CORESET of RMSI are considered when RMSI-PDCCH-Config is designed. However, for an SSB at an asynchronous raster frequency, this kind of relative positions are more, and relative offsets from frequency domain positions of SSBs at these asynchronous raster frequencies to the CORESET of the RMSI are also more, and an indication capability of RMSI-PDCCH-Config of an existing system may be exceeded. Therefore, after the terminal device finds SSB2 at an asynchronous raster frequency, the terminal device cannot determine a position of CORESET of RMSI based on indication information in an existing MIB.

In view of this, an implementation of the present disclosure provides a wireless communication method, which may effectively determine a frequency domain position of CORESET of RMSI associated with SSB on an asynchronous raster.

Figures 5, 6:
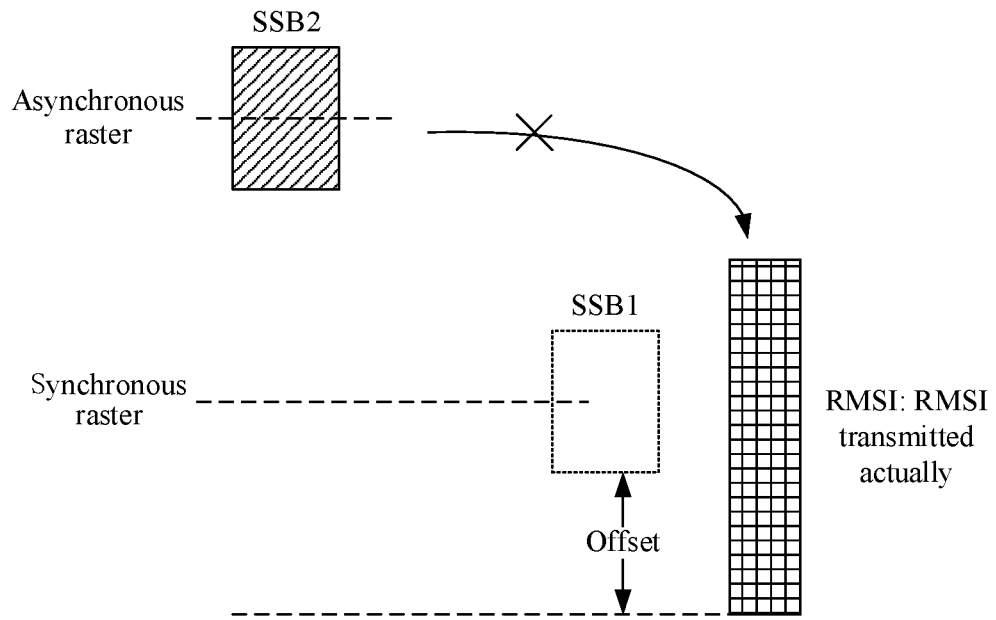
FIG. 5 is a schematic diagram of determining a frequency domain position of CORESET of RMSI based on a second type of SSB.
FIG. 6 is a schematic diagram of a wireless communication method according to an implementation of the present disclosure.

FIG. 6 is a schematic diagram of a wireless communication method 200 according to an implementation of the present disclosure. The method shown in FIG. 6 may be performed by a terminal device. The terminal device may be, for example, the terminal device 120 shown in FIG. 1.

It should be understood that technical solutions of implementations of the present disclosure may be applied to various communication scenarios, for example, a scenario of an unlicensed spectrum, or another communication scenario, which is not specifically limited by the implementations of the present disclosure.

As shown in FIG. 6, the method 200 may include at least part of following contents.

In 210, a terminal device detects a first type of SSB at a frequency on an asynchronous raster.

In 220, the terminal device determines, based on the first type of SSB, a frequency domain position (referred to as a target frequency domain position for convenience of description) of CORESET of RMSI associated with the first type of SSB.

Herein, the first type of SSB mainly refers to an SSB that is not a second type of SSB. In an implementation of the present disclosure, the first type of SSB may also be called non-CD SSB or other name. In 5G, in addition to the second type of SSB, considering factors such as measurement, a network device may send some SSBs additionally, and these SSBs may not be sent at a frequency on a synchronous raster. Essentially, these SSBs are measurement reference signals. However, as SSBs, they also carry Physical cell ID (PCI) information and information in MIB. Therefore, this type of SSB is referred to as the first type of SSB in an implementation of the present disclosure.

The association between the first type of SSB and the RMSI of the above content may be understood as: the first type of SSB and the RMSI belong to a same cell.

In order to describe the implementations of the present disclosure more clearly, an implementation mode of determining the target frequency domain position by the terminal device based on the first type of SSB will be described in detail with reference to four implementations.

Implementation 1

After a terminal device detects a first type of SSB actually sent by a network device at a first frequency, the terminal device may determine a reference frequency domain position of a second type of SSB, and then determine a target frequency domain position according to the reference frequency domain position of the second type of SSB and a first offset.

Specifically, the terminal device may determine a second frequency on a synchronous raster within a sub-band where the first frequency is located according to the first frequency on an asynchronous raster, and further, the terminal device may determine the reference frequency domain position of the second type of SSB according to the second frequency.

The first frequency may be pre-configured by the network device to the terminal device. Illustratively, the network device may perform configuring by Radio Resource Control (RRC) signaling, for example, the network device may configure the first frequency to the terminal device by an RRC reconfiguration message.

Figure 7:
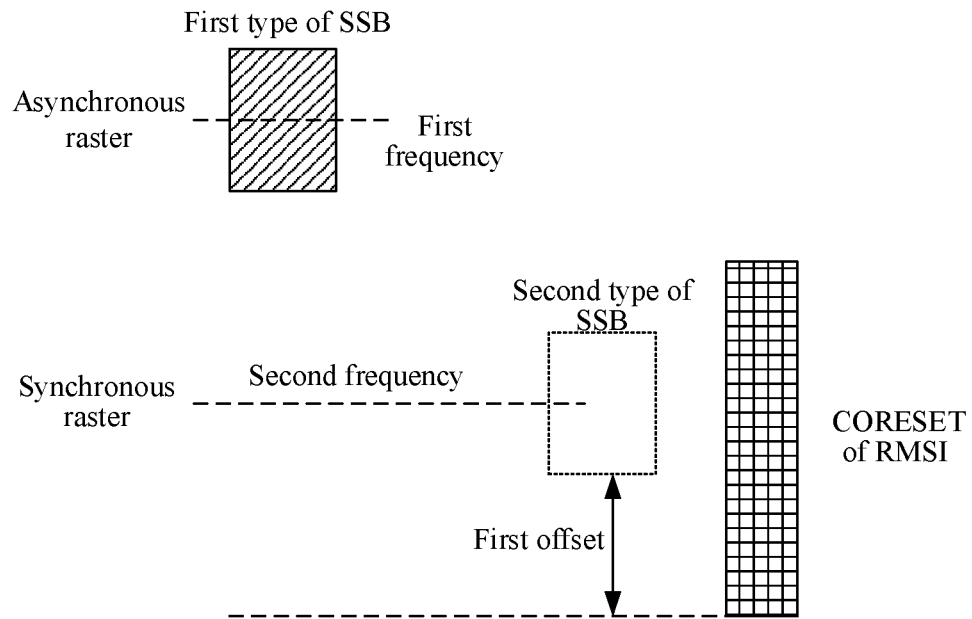
FIG. 7 is a schematic diagram of determining a frequency domain position of CORESET of RMSI based on a second type of SSB according to an implementation of the present disclosure.
Figure 8:
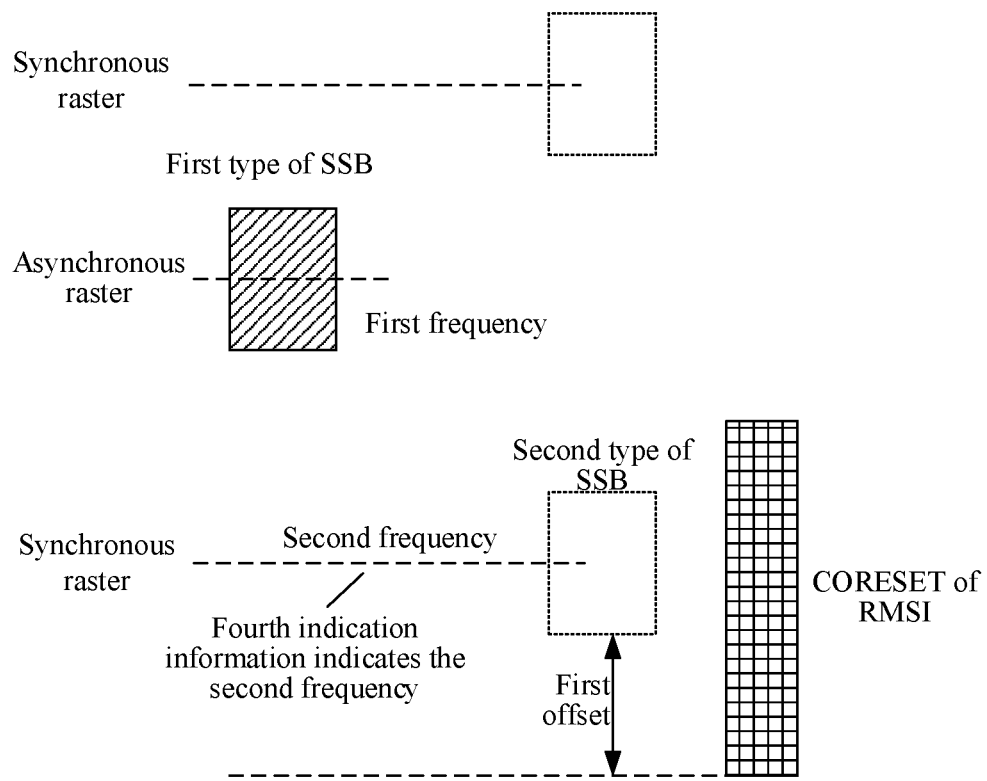
FIG. 8 is a schematic diagram of determining a frequency domain position of CORESET of RMSI based on a second type of SSB according to an implementation of the present disclosure.

In an implementation of the present disclosure, there may be at least one synchronous raster frequency corresponding to the first frequency within the sub-band where the first frequency is located. In FIG. 7, there is only one synchronous raster frequency corresponding to the first frequency within the sub-band where the first frequency is located. In FIG. 8, there are two synchronous raster frequencies corresponding to the first frequency within the sub-band where the first frequency is located.

When there are multiple synchronous raster frequencies corresponding to the first frequency within the sub-band where the first frequency is located, the terminal device determines the second frequency, including: the terminal device determines multiple frequencies on a synchronous raster based on the first frequency, and then the terminal device determines the second frequency among the multiple frequencies.

In an implementation, the terminal device may determine the second frequency according to a distance between each frequency in the multiple frequencies and the first frequency or a distance between each frequency in the multiple frequencies and a center of the sub-band where the first frequency is located.

Illustratively, the terminal device may determine a frequency closest to the first frequency among multiple frequencies as the second frequency.

Illustratively, the terminal device may determine a frequency farthest from the first frequency among multiple frequencies as the second frequency.

Illustratively, the terminal device may determine a frequency among multiple frequencies which is closest to the center of the sub-band where the first frequency is located as the second frequency.

Illustratively, the terminal device may determine a frequency among multiple frequencies which is farthest from the center of the sub-band where the first frequency is located as the second frequency.

In the implementation, if the quantity of frequencies (called third frequencies for convenience of description) determined by the terminal device according to the above implementation is greater than 1, the terminal device may select among the third frequencies again to determine the second frequency.

For example, the terminal device may determine a frequency higher than the first frequency among the third frequencies as the second frequency.

Or, the terminal device may determine a frequency lower than the first frequency among the third frequencies as the second frequency.

Or, if there are multiple third frequencies determined by the terminal device according to a distance between each frequency among the multiple frequencies and the first frequency, the terminal device may determine the second frequency according to a distance between each frequency among the third frequencies and the center of the sub-band where the first frequency is located.

Similarly, if there are multiple third frequencies determined by the terminal device according to a distance between each frequency among the multiple frequencies and the center of the sub-band where the first frequency is located, the terminal device may determine the second frequency according to a distance between each frequency among the third frequencies and the center of the sub-band where the first frequency is located.

In another implementation, referring to FIG. 8 again, the terminal device may receive fourth indication information, and the fourth indication information is used for indicating the second frequency. After receiving the fourth indication information, the terminal device may determine the second frequency among the multiple frequencies according to the fourth indication information.

In the implementation, the fourth indication information may only need to indicate a certain frequency among multiple frequencies, so the implementation may save signaling overhead. For example, when there are 13 synchronous raster frequencies within the sub-band where the first frequency is located, the fourth indication information may indicate which synchronous raster frequency among the above multiple frequencies is available through 4 bits.

Optionally, in an implementation of the present disclosure, the reference frequency domain position of a second type of SSB may refer to any one of following frequency domain positions: (a) a reference center frequency position of the second type of SSB; (b) a reference lower edge frequency domain position of the second type of SSB; (c) an upper edge position of the second type of SSB; or (d) an RB boundary frequency domain position of CRB overlapped with the second type of SSB.

Optionally, the method 200 may further include: the terminal device receives first indication information, and the first indication information is used for indicating the first offset. Herein, the first indication information may be carried in the MIB of the first type of SSB.

A size of the first offset may be a size of an offset between the reference frequency domain position of the second type of SSB and the target frequency domain position. The first offset may be an offset between the reference frequency domain position of the second type of SSB and the target frequency domain position, or the first offset may also be an offset in other physical meaning, which is not specifically limited in implementations of the present disclosure.

When the first offset is an offset between the reference frequency domain position of the second type of SSB and the target frequency domain position, the first offset may be any one of following offsets: a deviation between a minimum RB of the second type of SSB and a minimum RB of the CORESET of RMSI; a deviation between a maximum RB of the second type of SSB and a maximum RB of the CORESET of RMSI; or a deviation between a center RB of the second type of SSB and a center RB of the CORESET of RMSI.

For example, when the second type of SSB includes 20 RBs, the center RB of the second type of SSB is the 11th RB.

Optionally, the minimum RB of the second type of SSB in the above content may further be a minimum CRB overlapped with the second type of SSB, and the maximum RB of the second type of SSB may further be a maximum CRB overlapped with the second type of SSB. Or, the minimum RB, the maximum RB, or the center RB of the second type of SSB may further be a minimum or maximum RB overlapped with the RB.

For example, a sending position of RMSI is CRB 10 and a sending position of the second type of SSB is CRB 13.5 (representing the 7th subcarrier of CRB 14), then the minimum RB of the second type of SSB is CRB 13.

For another example, a sending position of RMSI is CRB 20 and a sending position of the second type of SSB is CRB 23.5, then the maximum RB of the second type of SSB is CRB 24.

Optionally, the first offset may include any one of following: (a) at least one RB; (b) at least one subcarrier; or (c) at least one RB and at least one subcarrier. That is, the first offset may be an RB-level offset, or a subcarrier-level offset, or RB-level and subcarrier-level offsets.

When the first offset is the RB-level and subcarrier-level offsets, the first indication information may indicate the RB-level offset and the subcarrier-level offset respectively through first sub-information and second sub-information.

It should be noted that the second type of SSB in an implementation of the present disclosure is not actually transmitted, but is an assumed SSB only for determining a frequency domain position of the CORESET of RMSI associated with the first type of SSB.

Implementation 2

Figure 9:
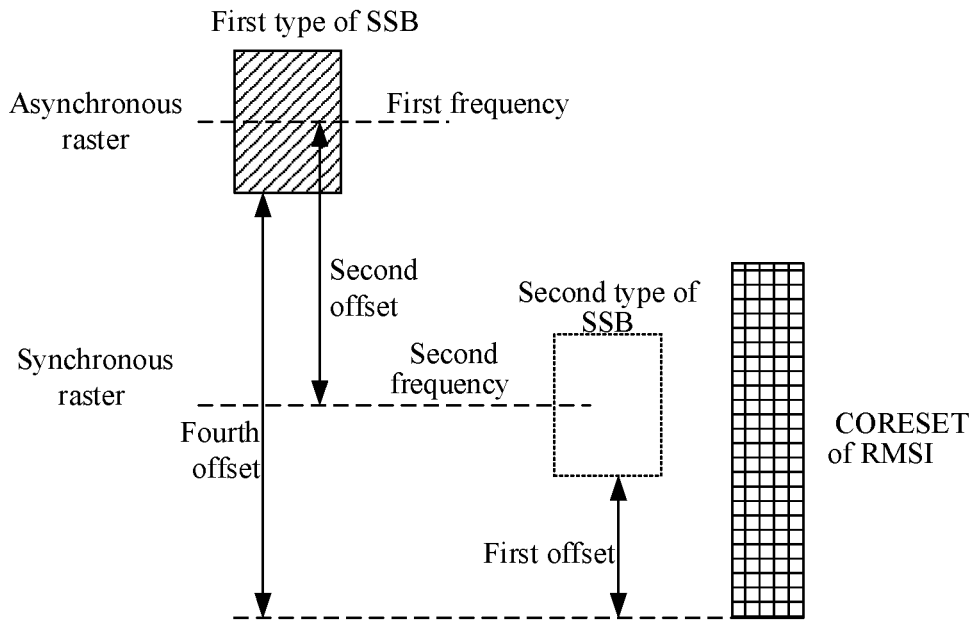
FIG. 9 is a schematic diagram of determining a frequency domain position of CORESET of RMSI based on a second type of SSB according to an implementation of the present disclosure.

As shown in FIG. 9, after the terminal device detects the first type of SSB actually sent by the network device on the first frequency, the terminal device may determine the second offset, and then determine the target frequency domain position according to the second offset, the first offset and a frequency domain position of the first type of SSB.

Specifically, a sum of the first offset and the second offset is a fourth offset, that is, the terminal device may determine an offset between the frequency domain position of the first type of SSB and the target frequency domain position according to the first offset and the second offset, and then the terminal device may determine the target frequency domain position based on the frequency domain position of the first type of SSB and the fourth offset.

Optionally, the frequency domain position of the first type of SSB may refer to any one of following frequency domain positions: (a) a center frequency position of the first type of SSB; (b) a frequency domain position of a lower edge of the first type of SSB; (c) a frequency domain position of an upper edge of the first type of SSB; or (d) an RB boundary frequency domain position of CRB overlapped with the first type of SSB.

Optionally, the second offset may include any one of following: (a) at least one RB; (b) at least one subcarrier; or (c) at least one RB and at least one subcarrier. That is, the second offset may be m RBs, or n subcarriers, or m RBs and n subcarriers. The n and m are positive integers.

Optionally, the second offset may be an offset between the frequency domain position of the first type of SSB and the reference frequency domain position of the second type of SSB; or, the second offset may be an offset between the first frequency and the second frequency.

In an implementation of the present disclosure, as an example, if the second offset is an offset between the frequency domain position of the first type of SSB and the reference frequency domain position of the second type of SSB, the terminal device determines the second offset, which may include: after the terminal device determines the second frequency based on the first frequency, the terminal device determines the reference frequency domain position of the second type of SSB according to the second frequency, and then the terminal device determines the second offset according to the frequency domain position of the first type of SSB and the reference frequency domain position of the second type of SSB.

If the second offset is an offset between the first frequency and the second frequency, the terminal device determines the second offset, which may include: after the terminal device determines the second frequency based on the first frequency, the terminal device may determine the second offset according to the first frequency and the second frequency.

As another example, the terminal device determines the second offset, which may include: the terminal device receives third indication information, and the third indication information is used for indicating the second offset.

Implementation 3

Figure 10:
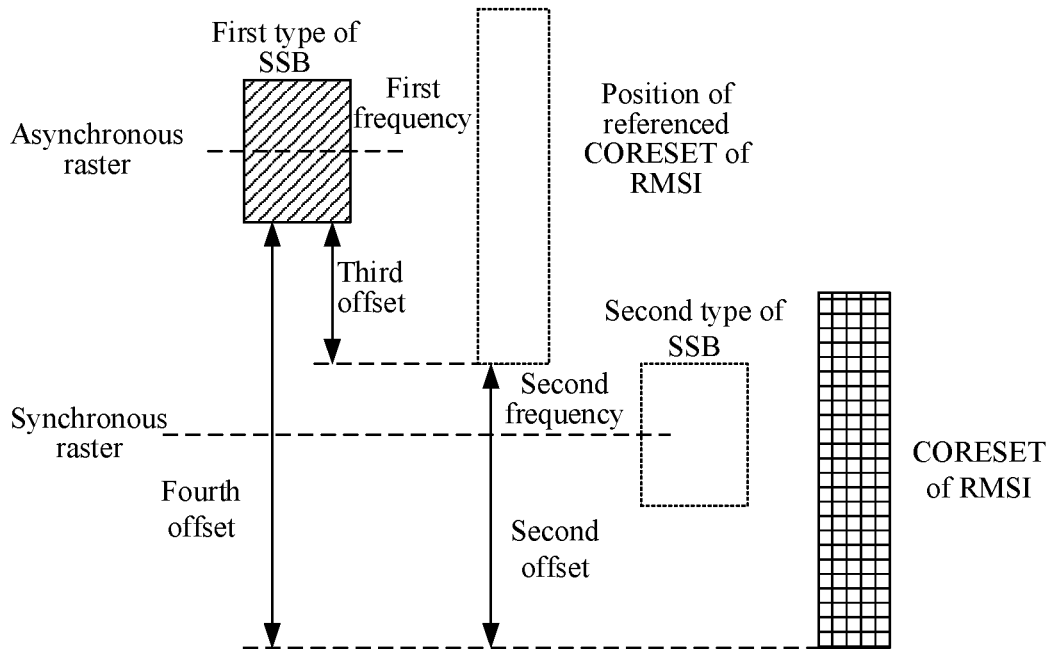
FIG. 10 is a schematic diagram of determining a frequency domain position of CORESET of RMSI based on a second type of SSB according to an implementation of the present disclosure.

As shown in FIG. 10, after the terminal device detects the first type of SSB actually sent by the network device on the first frequency, the terminal device may determine the second offset and the third offset, and then the terminal device determines the target frequency domain position according to the second offset, the third offset and the frequency domain position of the first type of SSB.

Specifically, a sum of the second offset and the third offset is a fourth offset, that is, the terminal device may determine an offset between the frequency domain position of the first type of SSB and the target frequency domain position according to the second offset and the third offset, and then the terminal device may determine the target frequency domain position based on the frequency domain position of the first type of SSB and the fourth offset.

Herein, a size of the second offset may be a size of an offset between the first frequency and the second frequency, or a size of an offset between a frequency domain position of a referenced CORESET of RMSI and the target frequency domain position.

Herein, a size of the third offset may be a size of an offset between the frequency domain position of the first type of SSB and the frequency domain position of the referenced CORESET of RMSI. The third offset may be an offset between the frequency domain position of the first type of SSB and the frequency domain position of the referenced CORESET of RMSI, or the third offset may also be an offset in other physical meaning, which is not specifically limited by implementations of the present disclosure.

When the third offset is of the size of the offset between the frequency domain position of the first type of SSB and the frequency domain position of the referenced CORESET of RMSI, the third offset may be any one of following offsets:

a deviation between a minimum RB of the first type of SSB and a minimum RB of the referenced CORESET of RMSI;

a deviation between a maximum RB of the first type of SSB and a maximum RB of the referenced CORESET of RMSI; or a deviation between a center RB of the first type of SSB and a center RB of the referenced CORESET of RMSI.

The minimum RB of the first type of SSB in the above content may further be a minimum CRB overlapped with the first type of SSB, and the maximum RB of the first type of SSB may further be a maximum CRB overlapped with the first type of SSB. Or, the minimum RB, the maximum RB, or the center RB of the first type of SSB may further be a minimum or maximum RB overlapped with the RB.

Optionally, the method 200 may further include: the terminal device receives second indication information, and the second indication information is used for indicating the third offset. The second indication information may be carried in the MIB of the first type of SSB. After the terminal device receives the second indication information, the terminal device may determine the third offset based on the second indication information.

The third offset may include any one of following: (a) at least one RB; (b) at least one subcarrier; or (c) at least one RB and at least one subcarrier. That is, the third offset may be an RB-level offset, or a subcarrier-level offset, or RB-level offset and subcarrier-level offsets.

When the third offset is RB-level and subcarrier-level offsets, the second indication information may respectively indicate the RB-level offset and the subcarrier-level offset of the third offset through third sub-information and fourth sub-information, that is, the third sub-information indicates the RB-level offset of the third offset and the fourth sub-information indicates the subcarrier-level offset of the third offset.

Implementation 4

Figure 11:
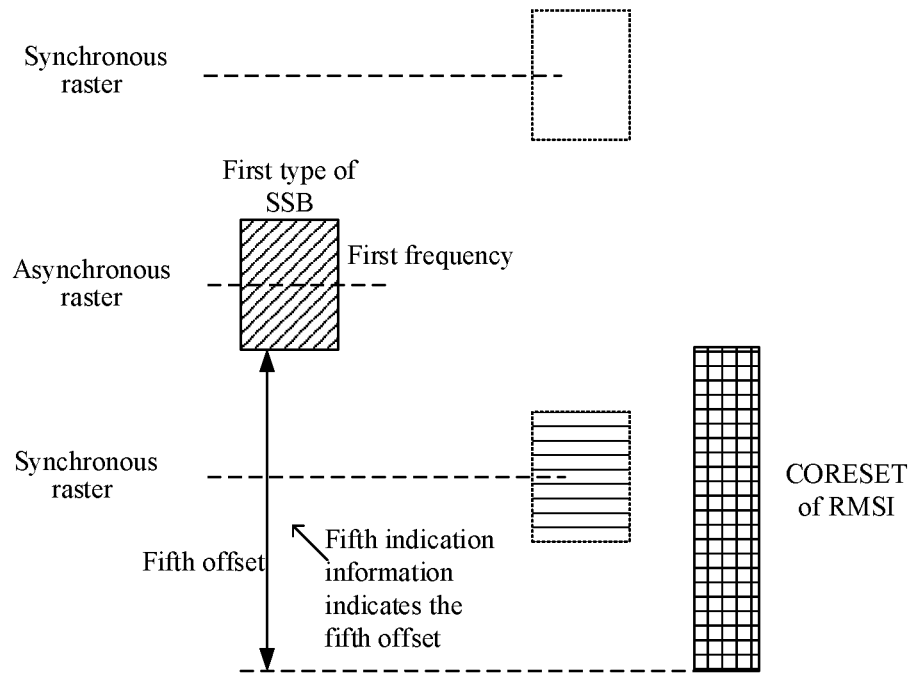
FIG. 11 is a schematic diagram of determining a frequency domain position of CORESET of RMSI based on a second type of SSB according to an implementation of the present disclosure.

As shown in FIG. 11, in an implementation, the terminal device may receive fifth indication information, and the fifth indication information is used for indicating a size of a fifth offset between a frequency domain position of the first type of SSB and a target frequency domain position. After receiving the fifth indication information and detecting the first type of SSB actually sent by the network device on the first frequency, the terminal device may determine the target frequency domain position according to the frequency domain position of the first type of SSB and the fifth offset.

Compared with the technical solution of other implementations, the technical solution of implementation 4 is more direct, however, signaling overhead of the technical solution of implementation 4 is larger.

It should be understood that in the implementations of the present disclosure, "first", "second" and "third", etc., are only for distinguishing different objects, but do not construct limitation on the scope of the implementations of the present disclosure.

It should further be understood that the quantity of synchronous raster frequencies corresponding to the first frequency within the sub-band where the first frequency is located is not limited in implementations 2 to 4, that is, in implementations 2 to 4, there may be only one synchronous raster frequency within the sub-band where the first frequency is located, and of course, there may also be multiple synchronous raster frequencies.

It should further be understood that although implementations 1 to 4 have been described above respectively, this does not mean that implementations 1 to 4 are independent, and descriptions of various implementations may be referred to each other. For example, the related description in the implementation 1 may be applied to the implementation 4.

In an implementation of the present disclosure, after a terminal device detects a first type of SSB at an asynchronous raster frequency, the terminal device may determine a frequency domain position of CORESET of RMSI associated with the first type of SSB according to the detected SSB, so that a frequency domain position of CORESET of RMSI associated with SSB on an asynchronous raster may be effectively determined.

The preferred implementations of the present disclosure have been described in detail above with reference to the accompanying drawings, but the present disclosure is not limited to the specific details of the above implementations. Within the technical conception scope of the present disclosure, various simple modifications may be made to the technical solution of the present disclosure, wherein these simple modifications all belong to the protection scope of the present disclosure.

For example, the various specific technical features described in the above specific implementations may be combined in any suitable way without contradiction. In order to avoid unnecessary repetition, various possible combination modes are not explained separately in the present disclosure.

For another example, various different implementations of the present disclosure may be combined arbitrarily, and as long as they do not violate the idea of the present disclosure, they should also be regarded as the contents disclosed in the present disclosure.

It should be understood that sequence numbers of the foregoing processes do not mean execution sequences in various method implementations of the present disclosure. The execution sequences of the processes should be determined according to functions and internal logic of the processes, and should not be construed as any limitation on the implementation processes of the implementations of the present disclosure.

The wireless communication method according to the implementations of the present disclosure has been described in detail above, and a communication apparatus according to implementations of the present disclosure will be described below with reference to FIGS. 12 and 13. The technical features described in the method implementations are applicable to following apparatus implementations.

Figure 12:
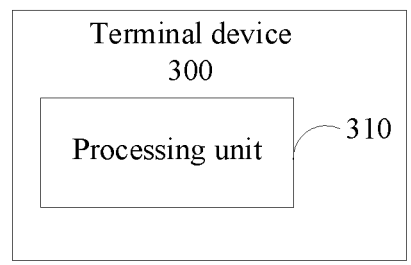
FIG. 12 is a schematic block diagram of a terminal device according to an implementation of the present disclosure.

FIG. 12 shows a schematic block diagram of a terminal device 300 of an implementation of the present disclosure. As shown in FIG. 12, the terminal device 300 includes a processing unit 310.

The processing unit 310, configured to detect a first type of Synchronous Signal Block (SSB) at a frequency on an asynchronous raster.

The processing unit 310 is further configured to determine a frequency domain position of Control Resource Set (CORESET) of remaining minimum system information (RMSI) associated with the first type of SSB based on the first type of SSB.

Optionally, in an implementation of the present disclosure, the processing unit 310 is specifically configured to: determine a second frequency on a synchronous raster in a sub-band where a first frequency is located based on the first frequency being detected on an asynchronous raster of the first type of SSB; determine a reference frequency domain position of a second type of SSB according to the second frequency, wherein the second type of SSB is an SSB transmitted on a synchronous raster; and determine a frequency domain position of CORESET of the RMSI according to the reference frequency domain position of the second type of SSB and the first offset, wherein a size of the first offset is a size of an offset between the reference frequency domain position of the second type of SSB and the frequency domain position of CORESET of the RMSI.

Optionally, in an implementation of the present disclosure, the processing unit 310 is specifically configured to determine a second offset; and determine the frequency domain position of the CORESET of the RMSI according to a first offset, the second offset and a frequency domain position of the first type of SSB.

Herein, a size of the first offset is a size of an offset between a reference frequency domain position of a second type of SSB and the frequency domain position of CORESET of the RMSI, the second offset is an offset between the frequency domain position of the first type of SSB and a reference frequency domain position of the second type of SSB, or, the second offset is an offset between a frequency domain position and a second frequency, and the second type of SSB is an SSB transmitted on a synchronous raster, the first frequency is a frequency where the terminal device detects the first type of SSB on an asynchronous raster, and the second frequency is a frequency on a synchronous raster in a sub-band where the first frequency is located.

Optionally, in an implementation of the present disclosure, the terminal device 300 further includes a communication unit 320, configured to receive first indication information, and the first indication information is used for indicating the first offset.

Optionally, in an implementation of the present disclosure, the first indication information is carried in a main information block (MIB) of the first type of SSB.

Optionally, in an implementation of the present disclosure, the first offset includes any one of the following: at least one resource block RB; at least one subcarrier; or, at least one RB and at least one subcarrier.

Optionally, in an implementation of the present disclosure, the first offset is any one of the following offsets: an offset between the minimum RB of the second type of SSB and the minimum RB of the CORESET of the RMSI; an offset between the maximum RB of the second type of SSB and the maximum RB of the CORESET of the RMSI; or an offset between a center RB of the second type of SSB and a center RB of the CORESET of the RMSI.

Optionally, in an implementation of the present disclosure, the minimum RB of the second type of SSB is a minimum common resource block (CRB) overlapped with the second type of SSB; and the maximum RB of the second type of SSB is a maximum CRB overlapped with the second type of SSB.

Optionally, in an implementation of the present disclosure, the processing unit 310 is specifically configured to determine a second offset and a third offset; and determine the frequency domain position of CORESET of the RMSI according to the third offset, the second offset and the frequency domain position of the first type of SSB. The second offset is an offset between the frequency domain position of the first type of SSB and a reference frequency domain position of the second type of SSB, or an offset between a first frequency and a second frequency. The second type of SSB is an SSB transmitted on a synchronous raster, and the first frequency is a frequency at which the terminal device detects the first type of SSB on an asynchronous raster, the second frequency is a frequency on a synchronization raster in a sub-band where the first frequency is located, and a size of the third offset is a size of an offset between the frequency domain position of the first type of SSB and the frequency domain position of a referenced CORESET of RMSI.

Optionally, in an implementation of the present disclosure, the terminal device 300 further includes a communication unit configured to receive second indication information, and the second indication information is used for indicating the third offset.

Optionally, in an implementation of the present disclosure, the second indication information is carried in an MIB of the first type of SSB.

Optionally, in an implementation of the present disclosure, the third offset includes any one of the following: at least one RB; at least one subcarrier; or at least one RB and at least one subcarrier.

Optionally, in an implementation of the present disclosure, the third offset is any one of the following offsets: an offset between the minimum RB of the first type of SSB and the minimum RB of the referenced CORESET of RMSI; an offset between the maximum RB of the first type of SSB and the maximum RB of the referenced CORESET of RMSI; or an offset between a center RB of the first type of SSB and a center RB of the referenced CORESET of RMSI.

Optionally, in an implementation of the present disclosure, the minimum RB of the first type of SSB is a minimum common resource block (CRB) overlapped with the first type of SSB; and the maximum RB of the first type of SSB is a maximum CRB overlapped with the first type of SSB.

Optionally, in an implementation of the present disclosure, if the second offset is an offset between the frequency domain position of the first type of SSB and the reference frequency domain position of the second type of SSB, the processing unit 310 is specifically configured to determine the second frequency based on the first frequency; determine the reference frequency domain position of the second type of SSB according to the second frequency; and determine the second offset according to the frequency domain position of the first type of SSB and the reference frequency domain position of the second type of SSB.

Optionally, in an implementation of the present disclosure, if the second offset is an offset between the first frequency and the second frequency, the processing unit 310 is specifically configured to determine the second frequency based on the first frequency; and determine the second offset according to the first frequency and the second frequency.

Optionally, in an implementation of the present disclosure, the terminal device 300 further includes a communication unit 320, configured to receive third indication information, and the third indication information is used for indicating the second offset.

Optionally, in an implementation of the present disclosure, the second offset includes any one of the following: at least one RB; at least one subcarrier; or at least one RB and at least one subcarrier.

Optionally, in an implementation of the present disclosure, the processing unit 310 is specifically configured to determine multiple frequencies on a synchronization raster based on the first frequency; and determine the second frequency among the multiple frequencies.

Optionally, in an implementation of the present disclosure, the processing unit 310 is specifically configured to determine the second frequency according to a distance between each frequency in the multiple frequencies and the first frequency, or according to a distance between each frequency in the multiple frequencies and a center of a sub-band where the first frequency is located.

Optionally, in an implementation of the present disclosure, the second frequency is a frequency closest to the first frequency among the multiple frequencies; or the second frequency is a frequency closest to the center of the sub-band where the first frequency is located among the multiple frequencies.

Optionally, in an implementation of the present disclosure, if the quantity of frequencies closest to the first frequency or frequencies closest to the center of the sub-band where the first frequency is located is greater than 1, the processing unit 310 is further configured to determine a frequency higher than the first frequency among the frequencies closest to the first frequency or closest to the center of the sub-band where the first frequency is located as the second frequency; or determine a frequency lower than the first frequency among the frequencies closest to the first frequency or closest to the center of the sub-band where the first frequency is located as the second frequency.

Optionally, in an implementation of the present disclosure, the terminal device 300 further includes the communication unit 320, configured to receive fourth indication information, and the fourth indication information is used for indicating the second frequency.

Optionally, in an implementation of the present disclosure, the terminal device 300 further includes the communication unit 320, configured to receive fifth indication information, and the fifth indication information is used for indicating a size of a fifth offset between a frequency domain position of the first type of SSB and the frequency domain position of the CORESET of the RMSI; and the processing unit 310 is specifically configured to determine the frequency domain position of the CORESET of the RMSI based on the frequency domain position of the first type of SSB and the fifth offset.

It should be understood that the terminal device 300 may correspond to the terminal device in the method 200, and may realize corresponding operations of the terminal device in the method 200, which will not be repeated here for sake of conciseness.

Figure 13:
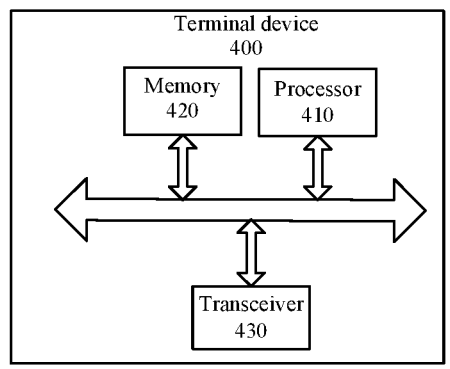
FIG. 13 is a schematic block diagram of a terminal device according to an implementation of the present disclosure.

FIG. 13 is a schematic diagram of a structure of a terminal device 400 provided by an implementation of the present disclosure. The terminal device 400 shown in FIG. 13 includes a processor 410. The processor 410 may call and run a computer program from a memory to implement the method in implementations of the present disclosure.

Optionally, as shown in FIG. 13, the terminal device 400 may further include a memory 420. The processor 410 may call and run a computer program from the memory 420 to implement the method in implementations of the present disclosure.

The memory 420 may be a separate device independent of the processor 410 or may be integrated in the processor 410.

Optionally, as shown in FIG. 13, the terminal device 400 may further include a transceiver 430, and the processor 410 may control the transceiver 430 to communicate with other devices. Specifically, the transceiver 630 may send information or data to other devices or receive information or data sent by other devices.

The transceiver 430 may include a transmitter and a receiver. The transceiver 430 may further include antennas, and the number of antennas may be one or more.

Optionally, the terminal device 400 may be specifically a terminal device of an implementation of the present disclosure, and the terminal device 400 may implement the corresponding processes implemented by the mobile terminal/terminal device in the various methods of implementations of the present disclosure, which will not be repeated here for brevity.

Figure 14:
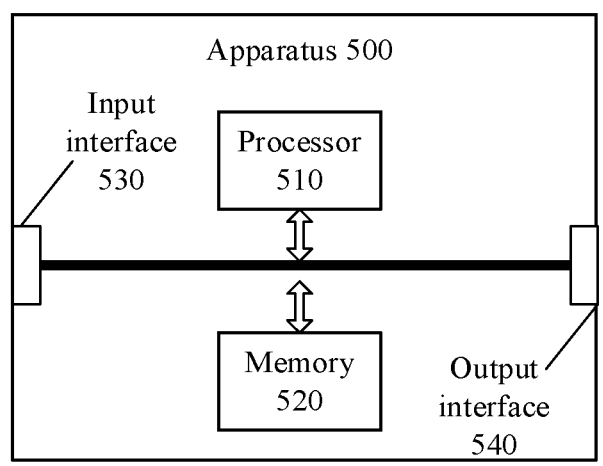
FIG. 14 is a schematic block diagram of an apparatus according to an implementation of the present disclosure.

FIG. 14 is a schematic diagram of a structure of an apparatus of an implementation of the present disclosure. An apparatus 500 shown in FIG. 14 includes a processor 510. The processor 510 may call and run a computer program from a memory to implement the method in an implementation of the present disclosure.

Optionally, as shown in FIG. 14, the apparatus 500 may further include a memory 520. The processor 510 may call and run a computer program from the memory 520 to implement the method in an implementation of the present disclosure.

The memory 520 may be a separate device independent of the processor 510 or may be integrated in the processor 510.

Optionally, the apparatus 500 may further include an input interface 530. The processor 510 may control the input interface 530 to communicate with other devices or chips. Specifically, the processor 510 may acquire information or data sent by other devices or chips.

Optionally, the apparatus 500 may further include an output interface 540. The processor 510 may control the output interface 540 to communicate with other devices or chips. Specifically, the processor 710 may output information or data to other devices or chips.

Optionally, the apparatus may be applied in a terminal device of an implementation of the present disclosure, and the apparatus may implement the corresponding processes implemented by the terminal device in the various methods of implementations of the present disclosure, which will not be repeated here for brevity.

Optionally, the apparatus 500 may be a chip. It should be understood that the chip mentioned in an implementation of the present disclosure may be referred to as a system-level chip, a system chip, a chip system or a system-on-chip, etc.

It should be understood that, the processor in an implementation of the present disclosure may be an integrated circuit chip having a signal processing capability. In an implementation process, the acts of the foregoing method implementations may be implemented by using an integrated logic circuit of hardware in the processor or instructions in a form of software. The processor may be a general purpose processor, a digital signal processor (Digital Signal Processing, DSP), an application specific integrated circuit (Application Specific Integrated Circuit, ASIC), a field programmable gate array (Field Programmable Gate Array, FPGA) or another programmable logic device, a discrete gate or a transistor logic device, or a discrete hardware component. The processor may implement or perform methods, acts and logical block diagrams disclosed in implementations of the present disclosure. The general purpose processor may be a microprocessor, or the processor may be any conventional processor or the like. The acts of the method disclosed with reference to implementations of the present disclosure may be directly implemented by a hardware decoding processor, or may be implemented by a combination of hardware and software modules in the decoding processor. The software modules may be located in a storage medium commonly used in the art, such as a random access memory, a flash memory, a read-only memory, a programmable read-only memory or an electrically erasable programmable memory, or a register. The storage medium is located in the memory, and the processor reads the information in the memory and completes the acts of the above method in combination with its hardware.

It may be understood that, the memory in an implementation of the present disclosure may be a volatile memory or a non-volatile memory, or may include both a volatile memory and a non-volatile memory. The non-volatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM), and is used as an external cache. Through exemplary but not limitative description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchronous link dynamic random access memory (Synchlink DRAM, SLDRAM), and a direct rambus dynamic random access memory (Direct Rambus RAM, DR RAM). It should be noted that the memory in the systems and methods described in this document is intended to include, but is not limited to, these and any other proper types of memories.

It should be understood that, the foregoing memory is an example for illustration but should not be construed as limiting. For example, optionally, the memory in implementations of the present disclosure may be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), a Direct Rambus RAM (DR RAM), or the like. That is, memories in implementations of the present disclosure are intended to include, but are not limited to, these and any other suitable types of memories.

An implementation of the present disclosure further provides a computer readable storage medium, configured to store a computer program.

Optionally, the computer-readable storage medium may be applied in a terminal device of an implementation of the present disclosure, and the computer program enables the computer to perform the corresponding processes implemented by the terminal device in various methods of implementations of the present disclosure, which will not be repeated here for brevity.

An implementation of the present disclosure also provides a computer program product, including computer program instructions.

Optionally, the computer program product may be applied in a terminal device of an implementation of the present disclosure, and the computer program instructions enable the computer to perform the corresponding processes implemented by the terminal device in various methods according to implementations of the present disclosure.

An implementation of the present disclosure further provides a computer program.

Optionally, the computer program may be applied in a terminal device of an implementation of the present disclosure. When the computer program is run on the computer, the computer is enabled to perform the corresponding processes implemented by the terminal device in various methods of implementations of the present disclosure.

Those of ordinary skill in the art will recognize that the exemplary elements and algorithm acts described in combination with implementations disclosed herein may be implemented in electronic hardware, or a combination of computer software and electronic hardware. Whether these functions are implemented in hardware or software depends on the specific application and design constraints of the technical solution. Skilled artisans may use different methods to implement the described functions in respect to each particular application, but such implementation should not be considered to be beyond the scope of the present disclosure.

Those skilled in the art may clearly understand that for convenience and conciseness of description, the specific working processes of the systems, apparatuses and units described above may refer to the corresponding processes in the method implementations and will not be described here.

In several implementations provided by the present disclosure, it should be understood that the disclosed systems, apparatuses and methods may be implemented in other ways. For example, the apparatus implementations described above are only illustrative, for example, the division of the units is only a logical function division, and there may be other division manners in actual implementation, for example, multiple units or components may be combined or integrated into another system, or some features may be ignored or not executed. On the other hand, the mutual coupling or direct coupling or communication connection shown or discussed may be indirect coupling or communication connection between apparatuses or units through some interface, and may be in electrical, mechanical or other forms.

The unit described as a separate component may or may not be physically separated, and the component shown as a unit may or may not be a physical unit, i.e., it may be located in one place or may be distributed over multiple network units. Some or all of the units may be selected according to actual needs to achieve the purpose of the implementations.

In addition, various functional units in various implementations of the present disclosure may be integrated in one processing unit, or the various units may be physically present separately, or two or more units may be integrated in one unit.

The functions may be stored in a computer readable storage medium if realized in a form of software functional units and sold or used as a separate product. Based on this understanding, the technical solution of the present disclosure, in essence, or the part contributing to the prior art, or the part of the technical solution, may be embodied in the form of a software product stored in a storage medium, including a number of instructions for causing a computer device (which may be a personal computer, a server, or a network device and the like) to perform all or part of the acts of the method described in various implementations of the present disclosure. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

What are described above are merely exemplary implementations of the present disclosure, but the protection scope of the present disclosure is not limited thereto. Any variation or substitution that may be easily conceived by a person skilled in the art within the technical scope disclosed by the present disclosure shall be included within the protection scope of the present disclosure. Therefore, the protection scope of the present disclosure shall be determined by the protection scope of the claims.

What we claim is:

1. A method for wireless communication, applied in an unlicensed spectrum, comprising:
   detecting, by a terminal device, a first type of Synchronous Signal Block (SSB) at a frequency on an asynchronous raster; and
   determining, by the terminal device, a frequency domain position of a Control Resource Set (CORESET) of Remaining Minimum System Information (RMSI) associated with the first type of SSB based on the first type of SSB; wherein determining, by the terminal device, the frequency domain position of the control resource set of the remaining minimum system information (RMSI) associated with the first type of SSB based on the first type of SSB, comprises:
   determining, by the terminal device, a second offset; and
   determining, by the terminal device, the frequency domain position of the CORESET of the RMSI according to a first offset, the second offset, and a frequency domain position of the first type of SSB;
   wherein, a size of the first offset is a size of an offset between a reference frequency domain position of a second type of SSB and the frequency domain position of the CORESET of the RMSI, the second offset is an offset between the frequency domain position of the first type of SSB and a reference frequency domain position of the second type of SSB, or, the second offset is an offset between a first frequency and a second frequency, and the second type of SSB is an SSB transmitted on a synchronous raster, the first frequency is a frequency where the terminal device detects the first type of SSB on an asynchronous raster, and the second frequency is a frequency on a synchronous raster in a sub-band where the first frequency is located;
   wherein the first offset is:
   an offset between a minimum RB of the second type of SSB and a minimum RB of the CORESET of the RMSI.

2. The method of claim 1, the method further comprises:
   receiving, by the terminal device, first indication information, wherein the first indication information is used for indicating the first offset.

3. The method of claim 2, wherein the first indication information is carried in a main information block (MIB) of the first type of SSB.

4. The method of claim 1, wherein the first offset comprises:
   at least one resource block (RB).

5. The method of claim 1, wherein the minimum RB of the second type of SSB is a minimum common resource block (CRB) overlapped with the second type of SSB; and
   the maximum RB of the second type of SSB is a maximum CRB overlapped with the second type of SSB.

6. The method of claim 1, wherein if the second offset is an offset between the frequency domain position of the first type of SSB and the reference frequency domain position of the second type of SSB, determining, by the terminal device, the second offset, comprises:
   determining, by the terminal device, the second frequency based on the first frequency;
   determining, by the terminal device, the reference frequency domain position of the second type of SSB according to the second frequency; and
   determining, by the terminal device, the second offset according to the frequency domain position of the first type of SSB and the reference frequency domain position of the second type of SSB.

7. The method of claim 6, wherein determining, by the terminal device, the second frequency based on the first frequency, comprises:
   determining, by the terminal device, a plurality of frequencies on a synchronous raster based on the first frequency; and
   determining, by the terminal device, the second frequency among the plurality of frequencies.

8. The method of claim 1, wherein the second offset comprises:
   at least one RB.

9. A terminal device, applied in an unlicensed spectrum, comprising: a processor and a transceiver, wherein
   the processor is configured to detect a first type of Synchronous Signal Block (SSB) at a frequency on an asynchronous raster; and
   the processor is further configured to determine a frequency domain position of a Control Resource Set (CORESET) of Remaining Minimum System Information (RMSI) associated with the first type of SSB based on the first type of SSB; wherein the processor is configured to:
   determine a second offset; and
   determine the frequency domain position of the CORESET of the RMSI according to a first offset, the second offset, and a frequency domain position of the first type of SSB;
   wherein a size of the first offset is a size of an offset between a reference frequency domain position of a second type of SSB and the frequency domain position of the CORESET of the RMSI, and the second offset is an offset between the frequency domain position of the first type of SSB and a reference frequency domain position of the second type of SSB, or, the second offset is an offset between a first frequency and a second frequency, and the second type of SSB is an SSB transmitted on a synchronous raster, the first frequency is a frequency where the terminal device detects the first type of SSB on an asynchronous raster, and the second frequency is a frequency on an synchronous raster in a sub-band where the first frequency is located; wherein the first offset is:
an offset between a minimum RB of the second type of SSB and a minimum RB of the CORESET of the RMSI.

10. The terminal device of claim 9, wherein the transceiver is configured to receive first indication information, wherein the first indication information is used for indicating the first offset.

11. The terminal device of claim 10, wherein the first indication information is carried in a main information block (MIB) of the first type of SSB.

12. The terminal device of claim 9, wherein the first offset comprises:
at least one resource block RB.

13. The terminal device of claim 9, wherein the minimum RB of the second type of SSB is a minimum common resource block (CRB) overlapped with the second type of SSB; and
the maximum RB of the second type of SSB is a maximum CRB overlapped with the second type of SSB.

14. The terminal device of claim 9, wherein if the second offset is an offset between the frequency domain position of the first type of SSB and the reference frequency domain position of the second type of SSB, the processor is configured to:
determine the second frequency based on the first frequency;
determine the reference frequency domain position of the second type of SSB according to the second frequency; and
determine the second offset according to the frequency domain position of the first type of SSB and the reference frequency domain position of the second type of SSB.

15. The terminal device of claim 14, wherein the processor is configured to:
determine a plurality of frequencies on a synchronous raster based on the first frequency; and
determine the second frequency among the plurality of frequencies.

16. The terminal device of claim 9, wherein the second offset comprises:
at least one RB.

* * * * *

UNITED STATES PATENT AND TRADEMARK OFFICE
CERTIFICATE OF CORRECTION

| | | |
|---|---|---|
| PATENT NO. | : 11,387,971 B2 | Page 1 of 1 |
| APPLICATION NO. | : 17/410260 | |
| DATED | : July 12, 2022 | |
| INVENTOR(S) | : Wenqiang Tian and Zuomin Wu | |

It is certified that error appears in the above-identified patent and that said Letters Patent is hereby corrected as shown below:

On the Title Page

Item [54], and in the Specification, Column 1 Line 2 Title should read as follows: Method for Determining System Information of Cell and Terminal Device Signed and Sealed this
Thirtieth Day of September, 2025

John A. Squires
*Director of the United States Patent and Trademark Office*